Oct. 25, 1955  A. A. MILLER  2,721,639
TORQUE AND CENTRIFUGAL ENGAGED CLUTCH
Filed Feb. 2, 1951  3 Sheets-Sheet 1

Inventor
A. A. Miller
By Hassel Downing Deckry
Attys.

Oct. 25, 1955     A. A. MILLER     2,721,639
TORQUE AND CENTRIFUGAL ENGAGED CLUTCH
Filed Feb. 2, 1951     3 Sheets-Sheet 2
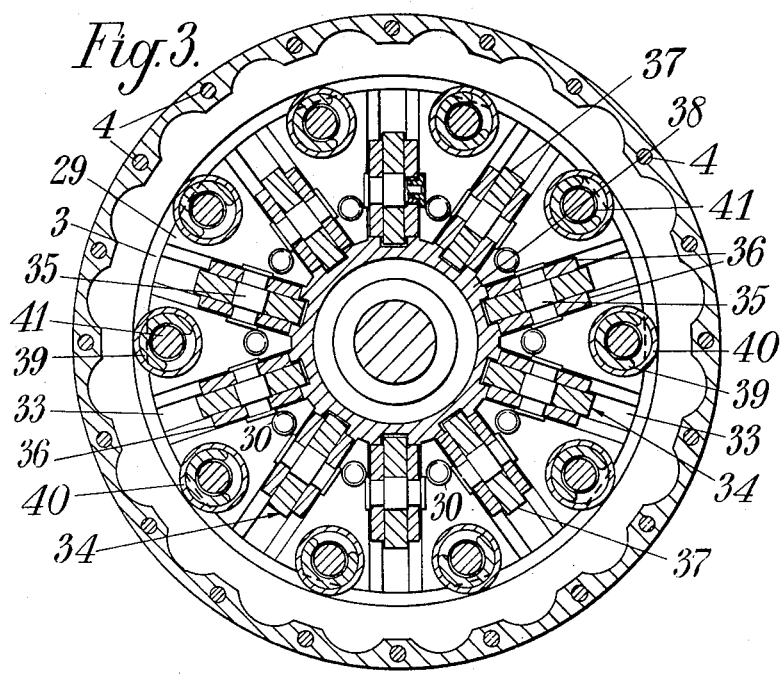
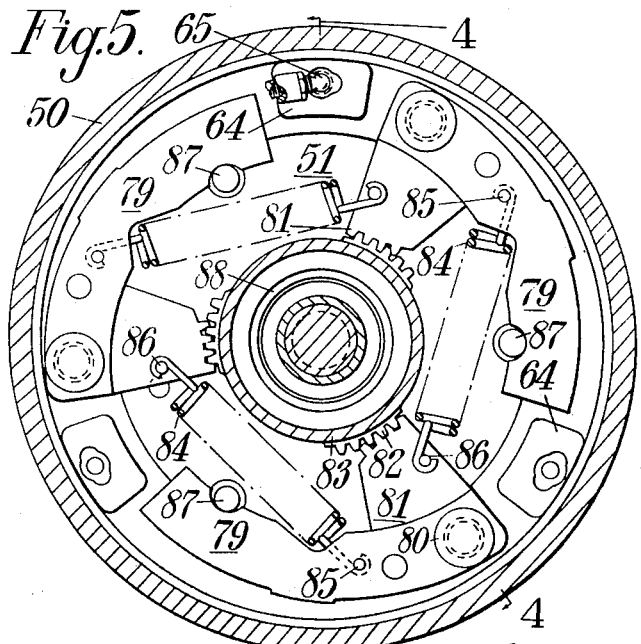
Inventor
A. A. Miller

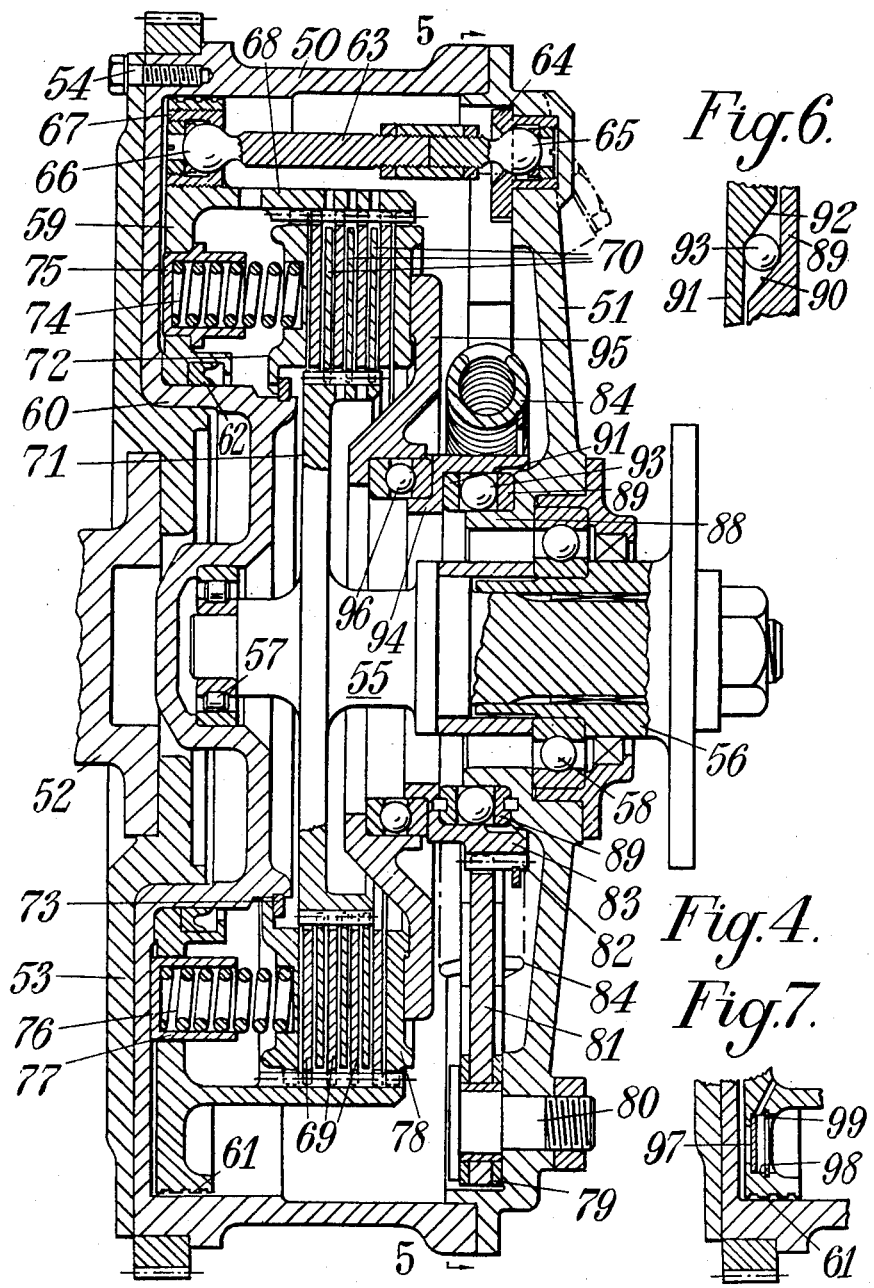

United States Patent Office 2,721,639
Patented Oct. 25, 1955

2,721,639

TORQUE AND CENTRIFUGAL ENGAGED CLUTCH

Albert Arthur Miller, Coventry, England, assignor to Self-Changing Gear Company Limited, Coventry, England Application February 2, 1951, Serial No. 209,031

16 Claims. (Cl. 192—54)

This invention relates to friction clutches and has for one of its objects to provide an improved clutch in which the effects of sudden changes in driving torque can be counteracted or minimised without affecting the operation of the clutch under ordinary or predetermined torque conditions. Momentary increases of torque or power surges of considerable magnitude and suddenness frequently occur in motor vehicle drives, particularly when changing gear, and the improved clutch arrangement can be applied with especial advantage to such drives although it may also be employed in other situations where similar conditions obtain. A further object of the invention is to provide a clutch having the above characteristics in combination with improved centrifugal means for controlling actuation of the clutch in accordance with its speed of rotation. Another object is to provide an improved form of clutch in conjunction with centrifugally operating control means.

The invention consists in a friction clutch including means responsive to trque reaction for engaging the friction surfaces under pressure varying with or proportional to the transmitted torque, and means for delaying the operation of said engaging means under changing torque conditions, the arrangement being such that with sudden torque increases of considerable or predetermined magnitude the clutch surfaces are permitted to slip momentarily so that the effects of such changes are counteracted or minimised.

The invention also consists in a clutch arrangement according to the preceding paragraph in which operation of the engaging means is delayed by a dashpot device associated with the said means.

In a preferred arrangement, said dashpot device comprises a hydraulic piston and cylinder provided with restricted flow orifice means, the piston being enaged through helically formed or inclined surfaces or threads with a driving member so that it is displaced to effect engagement of the clutch surfaces by a force proportional to the transmitted torque. The piston is also preferably provided with a non-return valve which permits the oil or other hydraulic medium to flow freely when the piston moves in clutch releasing direction.

According to a further feature of the invention, a piston drive element which is engaged through helically disposed or inclined surfaces with a driving member as aforesaid, is arranged to apply the required engaging pressure to the clutch surfaces through spring means, the travel of said element being limited so that the maximum torque transmitted cannot exceed a predetermined value.

Any desired form of friction clutch may be employed but preferably a multiple plate clutch is provided, the aforesaid piston drive element being arranged for axial displacement in a rotatable clutch casing and having a cylindrical extension or drum within which the annular clutch plates are arranged.

Engagement and disengagement of the clutch when required may be effected by any suitable means such as by a pedal or hand lever, or automatically by a centrifugal or other device.

In one convenient arrangement, centrifugal clutch actuating means is provided comprising centrifugal weights movable radially between spring loaded guide plates so shaped that outward movement of the weights causes axial separation of the plates and thereby applies pressure to the clutch surface elements.

In another convenient arrangement, the centrifugal operating means comprise pivoted centrifugal weights movable outwardly under spring tension and having inwardly directed arms having tooth engagement with an angularly displaceable ring, and means engaged with said ring for converting angular motion thereof into an axial thrust for applying engaging pressure to the clutch elements.

The invention also consists in a friction clutch comprising rotatable oil-tight casing containing the clutch engaging surfaces and centrifugal operating means for effecting engagement of such surfaces, said casing also containing or being adapted to contain an oil filling. The centrifugal operating means may comprise any of the features defined above or described hereinafter. The oil serves as a lubricating medium for the operative parts of the clutch, and where torque responsive clutch engaging means is provided, the oil can also serve as a delaying medium for the dashpot device associated therewith.

In the accompanying drawings,

Figure 3 is a cross section of the clutch taken on the line 3—3 of Figure 1;

Figure 4 is a side elevation in section taken on the line 4—4 of Figure 5 of a modified form of clutch constructed and arranged in accordance with the invention;

Figure 5 is a cross section of the clutch taken on the line 5—5 of Figure 4;

Figure 6 is a fragmentary view showing the cam surfaces for effecting axial movement of the ear clutch rang;

Figure 7 is a fragmentary view showing a relief valve in the oil piston.

Figures 1, 2:
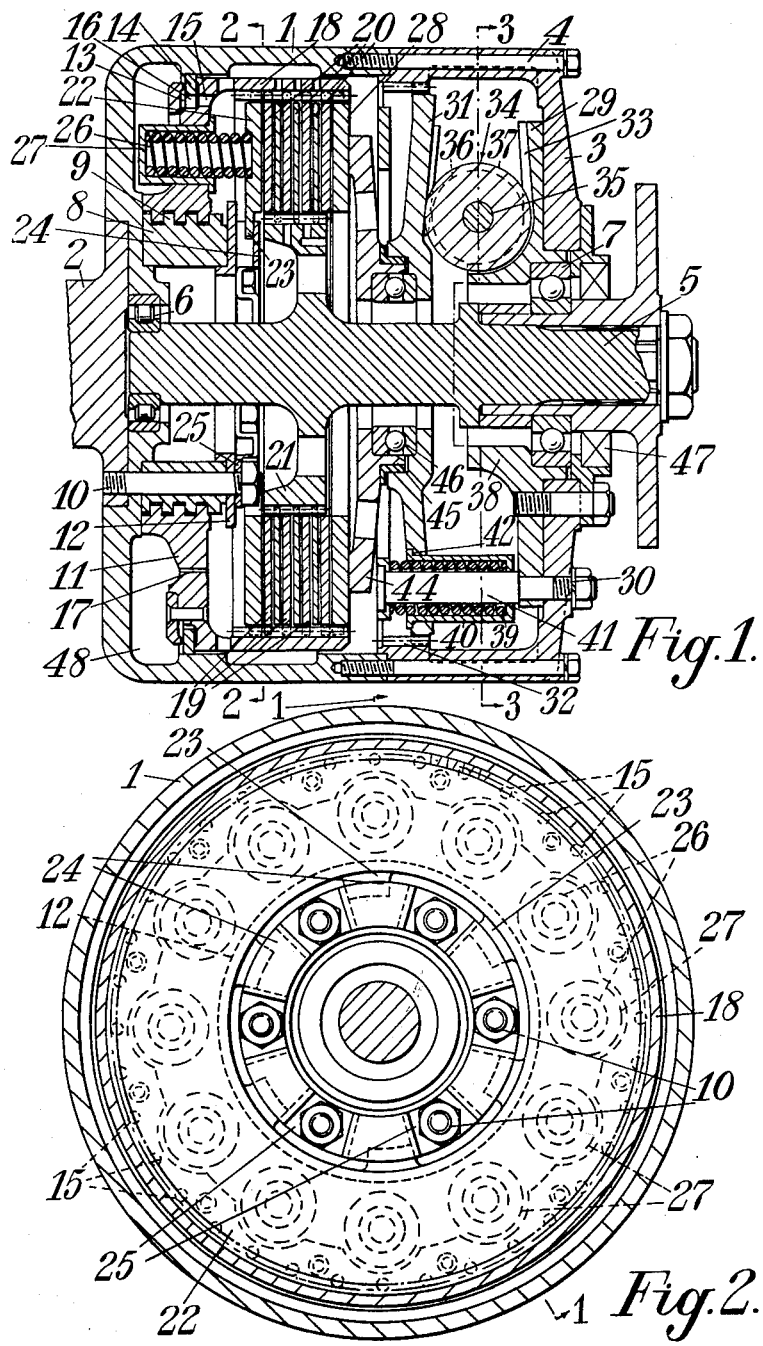
Figure 1 is a side elevation in section taken on the line 1—1 of Figure 2 of a clutch for a motor vehicle drive, constructed and arranged in accordance with the invention.
Figure 2 is a cross section of the clutch taken on the line 2—2 of Figure 1.

In carrying the invention into effect according to one convenient mode as applied by way of example to a centrifugally operated clutch for a motor vehicle drive as illustrated in Figures 1 to 3, a rotatable oil-filled casing 1 is provided to which the input shaft 2 is secured. The rear end of the casing is closed by a cover 3 secured by bolts 4. The output shaft 5 is carried within the casing upon bearings 6 and 7 and extends outside the casing at the rear end thereof. A driving sleeve 8 with an externally formed helical thread 9 is secured inside the input end of the casing by bolts 10, and an axially displaceable hydraulic piston drive element 11 of annular form having a corresponding internal thread is mounted on the sleeve 8, the thread arrangement being such that forward drive of the input shaft 2 tends to advance the piston element 11, the travel of which is limited by an annular stop member 12 secured by the bolts 10 at the forward end of sleeve 8. The piston element 11 has a peripheral groove 13 in which an annular valve plate 14 which fits the interior cylindrical surface of the casing 1 is axially displaceable. Passages 15 afford communication between groove 13 and the forward side of the piston, and the valve plate 14 is correspondingly apertured at 16 so that when the valve plate occupies the position shown in Figure 1 a free passage for oil is afforded through the groove 13, whereas in the opposite position of the valve plate these passages are closed. The piston is provided with one or more restricted orifices, as at 17, so that its forward motion, i. e. to the right as viewed in Figure 1, is impeded by the restricted flow of oil therethrough, and its rearward motion is relatively free owing to the opening of the passages 15 by the valve plate 14. The piston periphery is extended forwardly to constitute an internally splined drum 18 with which are engaged annular friction plates 19 of a multiple plate clutch of known type. The complementary annular friction plates 20 are carried upon an externally splined flange 21 of the output shaft 5. The rear pressure plate 22 of the clutch is engaged with the internal splines of the drum 18 and the inner periphery of this annular plate is formed with inwardly projecting lugs 23 which are engaged behind corresponding lugs 24 on the driving sleeve 8. The lugs 24 are formed on a ring 25 which is secured by the bolts 10 and extend forwardly, the arrangement being such that they limit the forward travel of the pressure plate 22. A series of coil springs 26 with their axes parallel to the clutch axis are interposed between the piston 11 and the pressure plate 22. The rear ends of these springs lie in carrier cylinders 27 secured in the piston disc with their closed ends projecting rearwardly therefrom. The front pressure plate 28 of the clutch is of annular form and is slidable axially in engagement with the splines of the drum 18.

In the present example the clutch is actuated by a centrifugal device in which weights move outwardly under centrifugal force and thereby effect axial movement of one of a pair of spring loaded guide plates by which pressure is applied to the clutch plates. A fixed guide plate 29 of annular form is secured to the casing cover 3 by bolts 30 and an axially movable guide plate 31 has teeth on its outer periphery engaged in splines 32 on the casing. The opposing faces of the guide plates are of shallow conical form such that the space between them narrows outwardly, and they are formed with a series of radial grooves 33 to receive and guide the centrifugal weights 34 which comprise composite rollers. Any convenient number of weights may be provided, for example ten as shown, and the radial grooves for receiving them are uniformly spaced. Each weight consists of three discs freely mounted side by side on a spindle 35, the outer discs 36 being identical and the middle discs 37 being of larger diameter and fitting within the radial grooves in the guide plates. The grooves in plate 29 are deeper than those in plate 31, the arrangement being such that the outer discs only engage plate 29 and them iddle discs only engage plate 31. Thus there will be a clearance between the outer discs and plate 31 and a similar clearance between the inner discs and plate 29, as shown in Figure 1. It being understood that the guide plates are drawn together under spring pressure, this arrangement ensures that the composite weights will move outwardly under centrifugal force in rolling engagement with the plates. Outward movement of the weights is limited by their engagement with the clutch casing, and their inward movement is limited by a curved extension 38 of the fixed guide plate 29. Loading springs 39 are provided to oppose movement of guide plate 31 away from guide plate 29. These springs are housed in cylindrical carriers 40 secured to the plate 31 and lying parallel to the shaft axis. The springs are of coil form and are mounted on bolts 41 secured to the casing cover 3 and extending through the carriers 40, the other ends of the bolts being secured to an annular apertured plate 42 upon which the ends of the springs 39 bear, their opposite ends abutting on flanges 43 on the carriers 40. Movement of the guide plate 31 under centrifugal action is transmitted to the pressure plate 28 of the clutch by the intermediate thrust plate 44, also of annular form and of dished or conical shape, which engages the mid-annular region of the pressure plate 28. The inner portion of the thrust plate 44 has a flange 45 upon which the guide plate 31 is rotatably mounted, a thrust bearing 46 being interposed between the two plates. This arrangement facilitates the rotation of the outer clutch plates relative to the clutch casing which accompanies displacement of piston 11 on helix 9. The casing and its cover are of oil-tight construction, there being an oil seal at 47 surrounding the shaft 5, and the interior is arranged to be filled or partly filled with oil. The various internal parts are appropriately apertured to permit free circulation, as will be seen from Figure 1, except for the chamber 48 formed between the end of the casing and the piston 11. Communication between this chamber and the rest of the casing is by way of the restricted orifice 17 on forward motion of the piston and by way of the valve controlled passages 15 and the said orifice on its rearward motion.

The arrangement is such that when the clutch is at rest, the springs 26 carried by the piston drive element are compressed by a small predetermined amount, the forward motion of the clutch pressure plate 22 being limited by its engagement with the lugs 24 on the driving sleeve. It will be understood that the clutch casing revolves as a whole with the input shaft and when the predetermined speed is reached, the centrifugal weights 34 will move outwardly in their guide grooves and the guide plates 31 will be displaced against the pressure of the springs 39 connecting the two guide plates. This displacement is transmitted through the thrust plate 44 to the front clutch pressure plate 28, compressing the interleaved plates and applying the clutch. The drive is transmitted from the input shaft 2 through the helically threaded sleeve 8 and piston drive element 11, the latter taking up a position corresponding to the magnitude of the transmitted torque and applying a corresponding pressure through the springs 26 to the clutch pressure plate 22. The clutch friction surfaces are thus engaged under a pressure proportional to the torque and these surfaces are proportioned so that they will slip if the torque increases materially for a given position of the piston drive element 11. Thus only a small increment of torque can be transmitted instantaneously, its magnitude being limited by the slipping of the clutch, but this increment of torque transmitted will produce a corresponding increment in the thrust exerted by the helix 9 on the piston 11. The resultant forward movement of the piston produces a corresponding increment of compression in the clutch loading springs 26, and this in turn causes a further increment in the transmitted torque. In this way a progressive increase in transmitted torque goes on as long as the slipping conditions prevail, or until the maximum torque capacity of the clutch is reached, but the rate of increase in transmitted torque is restricted by the dashpot action of the piston element, which can only move slowly against the oil pressure, the annular plate valve 14 being closed and the flow of oil to the chamber behind the piston being restricted to the orifice 17 provided. Although the clutch will not respond suddenly to transmit large increments of torque, relatively slow increases of torque will not result in clutch slip, since the correspondingly slow forward motion of the piston drive element will effect the required higher pressure engagement of the clutch surfaces up to the maximum pressure permitted, which is limited by the forward motion of the piston 11 being arrested by the stop 12 previously described. Any decrease in torque will result in correspondingly decreased clutch pressure, irrespective of the rate of decrease, since rearward motion of the piston drive element at once opens the annular plate valve and eliminates the dashpot action.

In carrying the invention into effect according to another mode as illustrated in Figures 4, 5, 6 and 7, a cylindrical clutch casing 50 having an end cover 51 is connected to the input shaft 52 by means of an outer plate 53 secured by bolts 54. The output shaft 55 carries a flanged driving sleeve 56 and is supported in bearings 57 and 58. An annular piston 59 is slidable axially upon an interior cylindrical guide portion 60 of the clutch casing and its outer periphery 61 has a small clearance with the interior of the casing 1, its inner periphery being provided with a seal 62. A series of uniformly spaced tie rods 63 form a driving connection between the clutch casing and the piston 59. Secured to the casing cover 51 are a series of socket plates 64 receiving spherical heads 65 on the rods, their opposite ends having spherical heads 66 received in sockets 67 secured to the piston 59. The tie rods 63 have a certain inclination with respect to the clutch axis and the arrangement is such that as the drive is transmitted the resulting tension in the rods will tend to displace the piston inwardly. A drum 68 integral with the piston 59 is internally splined for engagement with annular clutch plates 69, and interleaved with these are complementary clutch plates 70 engaged with external splines on a flange 71 on the output shaft 55. An annular clutch pressure plate 72 is also splined to the drum 68 and its movement in clutch applying direction is limited by a ring 73 on the casing part 60. Springs 74 are interposed between the pressure plate 72 and the piston, the rear ends of the springs being housed in cylindrical carriers 75 secured to the piston. Further springs 76 also bearing on the pressure plate 72 are housed in carriers 77 which pass freely through apertures in the piston and bear directly on the end wall of the clutch casing. Both sets of springs 74 and 76 are uniformly arranged about the clutch axis and the springs 76 are preferably fewer. The opposite clutch pressure plate 78 is engaged with the internal splines of the drum 68.

Centrifugally operated means for engaging the clutch comprise arcuate weights 79 pivoted near their ends upon pins 80 secured to the clutch casing and movable outwardly into engagement with the casing under centrifugal force. Each weight is formed with an inwardly extending arm 81 near its pivot and the inner ends of the arms are toothed for engagement with teeth 82 on a ring 83. Coil springs 84 are anchored at 85 to an intermediate point on the weights 79 and at 86 to the arms 81 of adjacent weights, the arrangement being such that the tension of the springs draws the weights inwardly against stops 87. The ring 83 is concentric with and movable angularly about an inwardly directed cylindrical flange 88 on the casing end cover 51. A cam ring 89 having a series of inclined cam surfaces 90 on its inner face is secured to the cover 51 by dowel pins or other means. A similar ring 91 having inclined cam surfaces 92 which are so disposed as to lie parallel to the cam surfaces 90 is similarly secured to the ring 83 and balls 93 are disposed between the opposed cam surfaces. The ring 83 has a flanged shoulder formation 94 to which is fitted an annular clutch thrust plate 95 with an interposed thrust bearing 96.

The arrangement is such that when the clutch is at rest, the springs 76 apply a predetermined pressure to the clutch pressure plate 72, motion of the latter to the right as viewed in Figure 4 being limited by the stop ring 83 so that the clutch cannot be applied. When the input shaft and casing have attained a predetermined speed, the centrifugal weights 79 move outwardly and rotate the ring 83 by a small amount which causes the ring 91 to be displaced axially inwardly through interaction of the cam surfaces and balls 93. This axial motion is transmitted to the thrust plate 95 and causes application of the clutch by compressing the interleaved plates 69 and 70. Drive is transmitted from the input shaft through the series of inclined tension rods 63 to the annular piston 59, the latter taking up an axial position corresponding to the magnitude of the transmitted torque and applying a corresponding pressure through the springs 74 to the clutch pressure plate 72. The clutch friction surfaces are thus engaged under a pressure which is approximately proportional to the torque and these surfaces are proportioned so that they will slip if the torque increases materially for a given position of the annular piston, the operation being similar to that of the previously described example. It may be desirable to provide a relief valve in the annular piston to facilitate its return motion, and a suitable valve is shown in Figure 7, comprising a movable valve plate 97 movable in a shouldered bore 98 and retained by a ring 99. In some circumstances such relief valve may be omitted. The clearance 61 serves the same purpose as the orifice 17 in the case of Figure 1.

The provision of the springs 76 which bear directly on the clutch casing improves the starting characteristics of the clutch and also affords a reversed drive of a predetermined small magnitude when the torque through the clutch is reversed.

In both the previously described examples the clutch casing is of completely enclosed construction and is filled or partially filled with oil which serves as the delaying medium for the dashpot device and also serves to lubricate the various parts, including the centrifugal mechanism, the parts being suitably apertured for this purpose. In this way long life and reliability is ensured for a centrifugally operated clutch in a simple and convenient manner.

By this invention there is provided a clutch arrangement in which the effects of sudden or momentary torque increases of considerable magnitude can be counteracted or minimised so that excessive fluctuations in the drive are modified or smoothed out. The invention also provides a simple and reliable form of centrifugally operated clutch either with or without the foregoing advantage. It will be understood that the invention is not restricted to the examples described, since details of construction and arrangement may be widely varied to suit particular requirements. Thus the clutch surfaces need not be of the multiple plate type but may comprise mutually engageable elements of any desired form. Also the actuation of the clutch may be effected by other forms of centrifugal device or by any suitable manually or power operated mechanism.

I claim:

1. A friction clutch comprising in combination driving and driven members, clutch members mounted for relative axial displacement, an axially displaceable pressure member for effecting engagement between said clutch members, an operative connection between the driving member and said pressure member, including reaction means, responsive to torque transmitted by the driving member to urge said pressure member in a clutch engaging direction under a force which increases with increase in the transmitted torque, and piston means forming part of a dashpot device for generating a delaying resistance to axial displacement of said pressure member under increasing torque conditions, the delay afforded being such that with the clutch engaged a sudden increase of considerable magnitude in the torque will result in a momentary slipping of the clutch surfaces whereby the effects of such torque changes on the transmission are minimised, spring means interposed between said piston means and the pressure member, and stop means limiting the travel of said piston means so that the maximum torque transmitted cannot exceed a predetermined value.

2. A clutch as claimed in claim 1, comprising a rotatable casing constituting the driving member, a cylinder formed in said casing concentric with the drive axis, and an annular piston displaceable axially in said cylinder and constituting therewith the dash-pot device, the torque responsive reaction means forming an operative connection between the driving member and said piston, and means for transmitting a force proportional to the axial displacement of said piston to one of the clutch members.

3. A clutch as claimed in claim 1, comprising tension members the inclination of which with respect to the drive axis is variable, said tension members being included in a drive connection between the driving member and the pressure member and constituting the reaction means by which torque is transmitted between said driving and pressure members.

4. A clutch as claimed in claim 1, comprising a rotatable casing constituting the driving member, a cylinder formed in said casing concentric with the drive axis, an annular piston displaceable axially in said cylinder and constituting therewith the dashpot device, tension members arranged in an annular series and disposed generally in line with the drive axis, and ball and socket connections between the ends of said tension members and the casing and piston respectively, the inclination of said tension members being variable in accordance with the torque transmitted by them and constituting the reaction means which transmit displacement to the pressure member.

5. A clutch as claimed in claim 1, comprising multiple plates in interleaved formation, a cylindrical member engaged with one set of said plates, said cylindrical member forming part of axially displaceable piston means forming part of the dashpot device.

6. A friction clutch comprising in combination, driving and driven members, clutch members mounted for relative axial displacement, an axially displaceable pressure member for effecting engagement between said clutch members, an operative connection between the driving member and said pressure member including reaction means responsive to torque transmitted by the driving member to urge said pressure member axially in a clutching direction under a force which increases with increase in the transmitted torque, means for generating a delaying resistance to axial displacement of said pressure member under increasing torque conditions, the delay afforded being such that with the clutch engaged a sudden increase of considerable magnitude in the torque will result in a momentary slipping of clutch surfaces and thereby the effects of such torque changes on the transmission are minimised, a second axially displaceable pressure member engageable with the clutch surfaces at the end thereof opposite to that engageable by the first pressure member, and means for actuating said second pressure member to effect engagement or disengagement of the clutch independently of the operating torque responsive means.

7. A clutch as claimed in claim 6, including centrifugally operating means for actuating said second pressure member.

8. A clutch as claimed in claim 6, comprising guide plates mounted for relative axial displacement, centrifugal weights movable radially between said guide plates, and spring loading means urging the guide plates together, said guide plates being so shaped that outward movement of the weights causes separation of the plates, and means for transmitting such separation movement to the second pressure member.

9. A clutch as claimed in claim 6, comprising radially grooved guide plates mounted for relative axial displacement, centrifugal weights movable radially between said guide plates, each weight comprising three discs freely mounted on a spindle and the middle disc being of larger diameter than the outer discs and fitting within one of said radial grooves, the groove in one plate being of greater depth than the groove in the other plate so that the plate with the deeper groove is engaged by the outer discs only and the plate with the shallower groove is engaged by the middle disc only, spring loading means urging the guide plates together, said guide plates being so shaped that outward movement of the weights causes separation of the plates, and means for transmitting such separation movement to the second pressure member.

10. A clutch as claimed in claim 6, comprising a rotatable casing, a radially grooved guide plate secured to an end wall of the casing, a second radially grooved guide plate concentric with the first and axially displaceable relative thereto, slidable splines connecting the said second guide plate in driving relation with the casing, centrifugal weights movable radially between said guide plates, each weight comprising three discs freely mounted on a spindle and the middle disc being of larger diameter than the outer discs and fitting within one of said radial grooves, the groove in one plate being of greater depth than the groove in the other plate so that the plate with the deeper groove is engaged by the outer discs only and the plate with the shallower groove is engaged by the middle disc only, spring loading means urging the guide plates together, said guide plates being so shaped that outward movement of the weights causes separation of the plates, and a thrust plate interposed between said second guide plate and one of the clutch elements for transmitting axial displacement to the latter, said thrust plate being rotatable relative to the said guide plate.

11. A clutch as claimed in claim 6, comprising centrifugal weights pivoted for outward movement, tension springs opposing such outward movement, an inwardly directed arm on each weight, an angularly movable ring, toothed engagement means between each of said arms and said ring for transmitting angular motion to the latter, and means engaged with said ring for converting angular motion thereof into an axial thrust for applying engaging pressure to the clutch elements.

12. A clutch as claimed in claim 6, comprising centrifugal weights pivoted for outward movement, tension springs opposing such outward movement, an inwardly directed arm on each weight, an angularly movable ring, toothed engagement means between each of said arms and said ring, cam surfaces on said ring, a second ring having corresponding cam surfaces, and thrust balls between the said cam surfaces, the arrangement being such that angular movement of said first ring is converted into axial thrust for applying engaging pressure to the clutch elements.

13. A clutch as claimed in claim 6, comprising a rotatable oiltight casing containing the clutch engaging surfaces, said casing being adapted to contain an oil filling, and centrifugal operating means located within said casing for maintaining engagement of the clutch when the torque responsive means is operative and for disengaging the clutch when the speed falls below a predetermined value.

14. A clutch as claimed in claim 6, comprising a rotatable oiltight casing containing the clutch engaging surfaces, said casing being adapted to contain an oil filling, and centrifugal operating means located within said casing for maintaining engagement of the clutch when the torque responsive means is operative and for disengaging the clutch when the speed falls below a predetermined value.

15. A clutch as claimed in claim 1, in which the dashpot device for generating the delaying resistance is a hydraulic device, and including a rotatable oiltight casing containing the clutch engaging surfaces, said casing being adapted to contain an oil filling and said oil filling affording the hydraulic medium for the dashpot device.

16. A clutch as claimed in claim 6, in which the dashpot device for generating the delaying resistance is a hydraulic device, and including a rotatable oiltight casing containing the clutch engaging surfaces, said casing being adapted to contain an oil filling and said oil filling affording the hydraulic medium for the dashpot device.

References Cited in the file of this patent

UNITED STATES PATENTS

| | | |
|---|---|---|
| 834,499 | Sturtevant | Oct. 30, 1906 |
| 1,027,377 | Dennis | May 21, 1912 |
| 1,632,526 | Willgoos | June 14, 1927 |
| 1,841,284 | Gillett | Jan. 12, 1932 |
| 1,882,805 | Gillett | Oct. 18, 1932 |
| 1,990,039 | Lansing | Feb. 5, 1935 |
| 2,001,931 | Lyman | May 21, 1935 |
| 2,351,996 | Morgan | June 20, 1944 |
| 2,419,890 | Freeborn | Apr. 29, 1947 |
| 2,540,965 | Schellinger | Feb. 6, 1951 |
| 2,546,633 | Dodge | Mar. 27, 1951 |
| 2,591,989 | Winther | Apr. 8, 1952 |

FOREIGN PATENTS

| | | |
|---|---|---|
| 508,050 | Germany | Dec. 15, 1928 |
| 334,245 | Italy | Jan. 23, 1936 |
| 660,180 | Germany | May 19, 1938 |
| 727,768 | France | Apr. 4, 1932 |